(12) United States Patent
Zhu

(10) Patent No.: US 11,150,540 B2
(45) Date of Patent: Oct. 19, 2021

(54) PHOTOGRAPHIC EQUIPMENT ASSEMBLY AND DETACHABLE QUICK CONNECTION APPARATUS THEREOF

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 0 days.

(21) Appl. No.: 15/930,474

(22) Filed: May 13, 2020

(65) Prior Publication Data

US 2020/0272031 A1  Aug. 27, 2020

Related U.S. Application Data

(63) Continuation of application No. PCT/CN2019/075188, filed on Feb. 15, 2019.

(51) Int. Cl.
*G03B 17/56* (2021.01)
*F16M 11/04* (2006.01)
*F16M 11/32* (2006.01)

(52) U.S. Cl.
CPC ......... *G03B 17/561* (2013.01); *F16M 11/041* (2013.01); *F16M 11/32* (2013.01); *F16M 2200/02* (2013.01)

(58) Field of Classification Search
CPC .............................. G03B 17/561; F16M 11/32
See application file for complete search history.

(56) References Cited

U.S. PATENT DOCUMENTS 10,845,679 B2 * 11/2020 Zhu .................... F16M 11/08

* cited by examiner

*Primary Examiner* — Minh Q Phan

(57) ABSTRACT

The present disclosure relates to a detachable quick connection apparatus for photographic equipment and a photographic equipment assembly. The apparatus comprises a locking means and a connection assembly, the locking means comprising a fixed seat provided with at least one through hole and a driving means rotatable relative to the fixed seat, at least one latching member being provided between the fixed seat and the driving means, the connection assembly is provided with an engagement slot which is engaged by the locking member, the locking means comprises a locking member provided in the driving means and a locking spring, the locking member comprises a locating member and a first elastic member which are mounted in the driving means, the locating member is at least partially engaged between the fixed seat and the driving means at the releasing position so that the driving means is stopped at the releasing position.

10 Claims, 9 Drawing Sheets

200
PHOTOGRAPHIC EQUIPMENT ASSEMBLY AND DETACHABLE QUICK CONNECTION APPARATUS THEREOF

CROSS REFERENCE OF RELATED APPLICATIONS

This application is a continuation of International Patent Application No. PCT/CN2019/075188, International Filling Date Feb. 15, 2019, entitled PHOTOGRAPHIC EQUIPMENT ASSEMBLY AND DETACHABLE QUICK CONNECTION APPARATUS THEREOF; which is incorporated herein by reference in its entirety.

TECHNICAL FIELD

The present disclosure relates to the field of photography, video recording, and more particularly to a detachable quick connection apparatus for photography equipments and a photographic equipment assembly having the detachable quick connection apparatus.

BACKGROUND

When video shooting with a camcorder, it requires to mount to a stable support, tripod or other devices. A camcorder is often fixed by a connection apparatus, for example a connection plate or a quick connection coupler with double calipers. However, there are troublesome problems in mounting and detaching the camcorder fixed by the above connection apparatus, which thereby causing a delay in the mounting and detaching, and even miss the opportunity to capture the crucial moment of a photo or a video.

SUMMARY

The main objective of the present disclosure is to provide a detachable quick connection apparatus which overcomes the above shortcomings and a photographic equipment assembly having the detachable quick connection apparatus.

The present disclosure provides a detachable quick connection apparatus for photographic equipment, comprising a locking means comprising a fixed seat of which a sidewall is provided with at least one through hole, and a driving means sleeved around the fixed seat and rotatable relative to the fixed seat between a locking position and a releasing position, at least one latching member being provided between the fixed seat and the driving means; and a connection assembly detachably mounted in the locking means, of which a periphery is provided with an engagement slot which is engaged by the locking member at the latching position through the through hole; the locking means further comprises a locking member provided in the driving means and a locking spring arranged between the fixed seat and the driving means, the locking member comprises a locating member and a first elastic member which abut against each other and are mounted in the driving means, when the driving means is at the releasing position, the locating member is at least partially engaged between the fixed seat and the driving means so that the driving means is stopped at the releasing position.

In some embodiments, the locking member further comprises a pushing member, a stepped hole is defined in the fixed seat, the stepped hole comprises a first receiving hole and a second receiving hole arranged axially, the pushing member is movably arranged in the first receiving hole of the stepped hole, when the driving means is at the releasing position, the locating member is at least partially engaged into the second receiving hole of the stepped hole and abuts against the pushing member, an end of the pushing member protrudes from the stepped hole.

In some embodiments, a length of the locating member of the locking member in an axial direction of the stepped hole is more than a length of the second receiving hole of the stepped hole in the axial direction.

In some embodiments, an inner surface of the driving means comprises an acting portion which is spaced apart from an outer surface of the fixed seat with a gap formed there between, and the gap has a width which is wider in a first circumferential side of the acting portion and narrower in an opposite second circumferential side of the acting portion, each of the at least one latching member locates in a respective gap, when the driving means rotates relative to the fixed seat, the acting portion rotates along its circumferential direction, the first circumferential side of the acting portion is aligned with the through hole at the releasing position, the second circumferential side of the acting portion is aligned with the through hole at the locking position.

In some embodiments, a first locating hole is defined on the acting portion for receiving the locating member and the first elastic member of the locking member.

In some embodiments, at least one protrusion is provided on an flange of the fixed seat adjacent to the connection assembly, the connection assembly is provided with a locating slot matching with the protrusion.

In some embodiments, the locking means comprises a driving member, the driving means comprises a second locating hole, the driving member is provided in the second locating hole.

In some embodiments, a releasing means facing the fixed seat is mounted in the connection assembly is, the releasing means is arranged corresponding to a position of the second locating hole.

In some embodiments, the releasing means comprises a fixing member and a releasing member movable relative to the fixing member, a driving block of the driving member protrudes into the releasing member at the locking member, when the connection assembly is released, the driving means is rotated from the locking position to the releasing position, the driving block drives the releasing member to rotate, the pushing member of the locking member protrudes into the releasing member at the releasing position.

The present disclosure also provides a photographic equipment assembly comprising a camera stand, the photographic equipment assembly further comprises the above detachable quick connection apparatus for photographic equipment, the detachable quick connection apparatus is mounted on the camera stand.

The detachable quick connection apparatus provided by the present disclosure is simple in the structure, compact, easy to carry and convenient to assemble and disassemble. The apparatus can achieve locking automatically, has a reliable locking effect and improves the security of the connection.

BRIEF DESCRIPTION OF THE DRAWINGS

The further features of the present disclosure will be apparent from the descriptions of the preferred embodiments which are only provided by means of examples in conjunction with accompanying drawings, wherein.

DESCRIPTION OF THE EMBODIMENTS

The present disclosure will be further described in detail with reference to the accompanying drawings and embodiments so that the objective and the advantages of the present disclosure will be more apparent.

Figure 1:
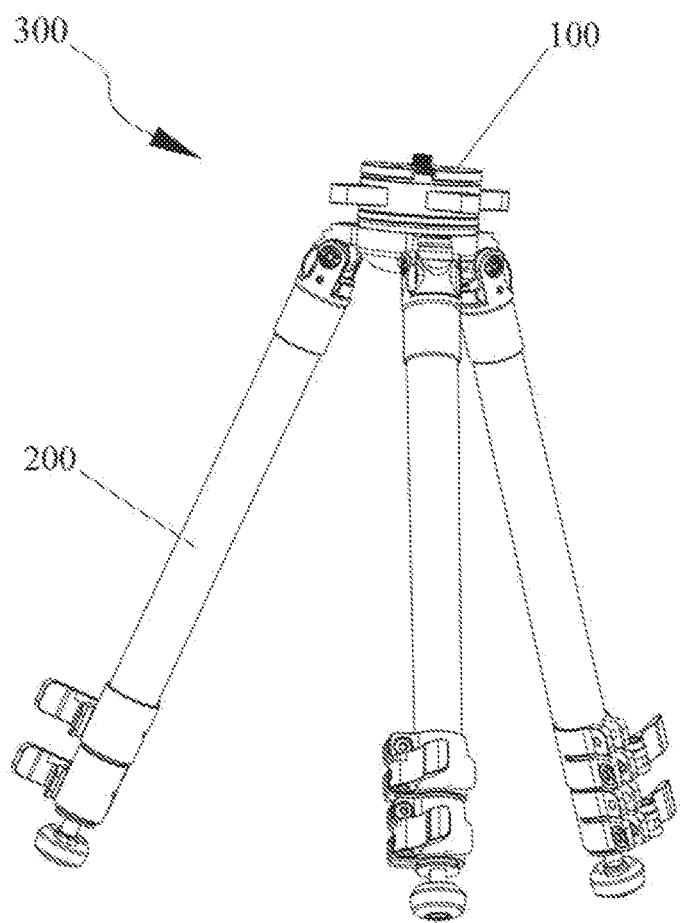
FIG. 1 is a schematic view of a photographic equipment assembly according to one embodiment of the present disclosure.

As shown in FIG. 1, a photographic equipment assembly 300 according to the present disclosure includes a camera stand 200 and a detachable quick connection apparatus 100. The detachable quick connection apparatus 100 is mounted onto the camera stand 200. In the embodiment, the camera stand 200 is a tripod, and the detachable quick connection apparatus 100 is connected with the camera stand 200 by means of for example threaded connection. The camera stand 200 can be the same as or similar to those known in the prior art, so it will not be discussed in detail here.

Figure 2:
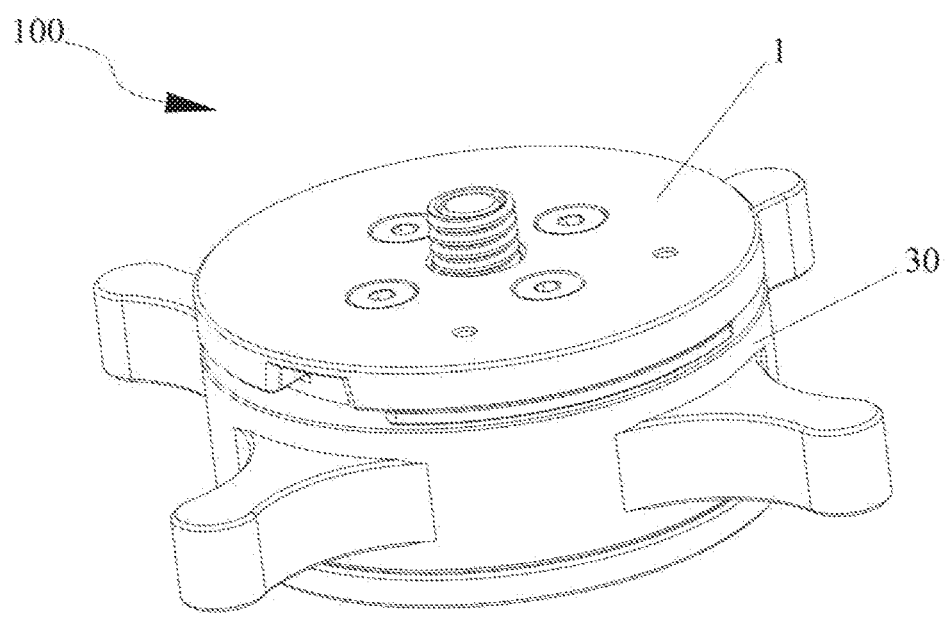
FIG. 2 is a schematic view an embodiment of a detachable quick connection apparatus according to the present disclosure.
Figure 3:
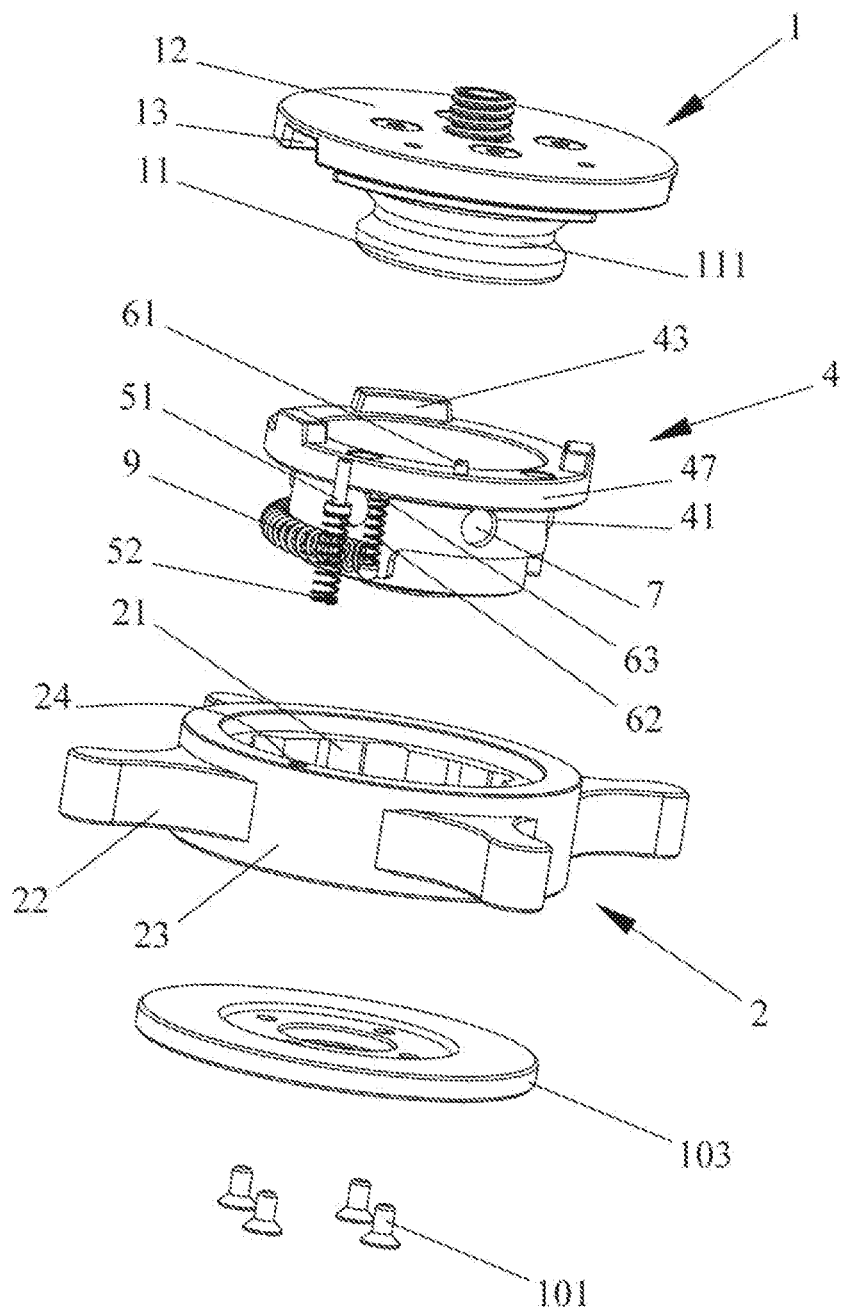
FIG. 3 is an exploded view of the detachable quick connection apparatus shown in FIG. 2.
Figure 4:
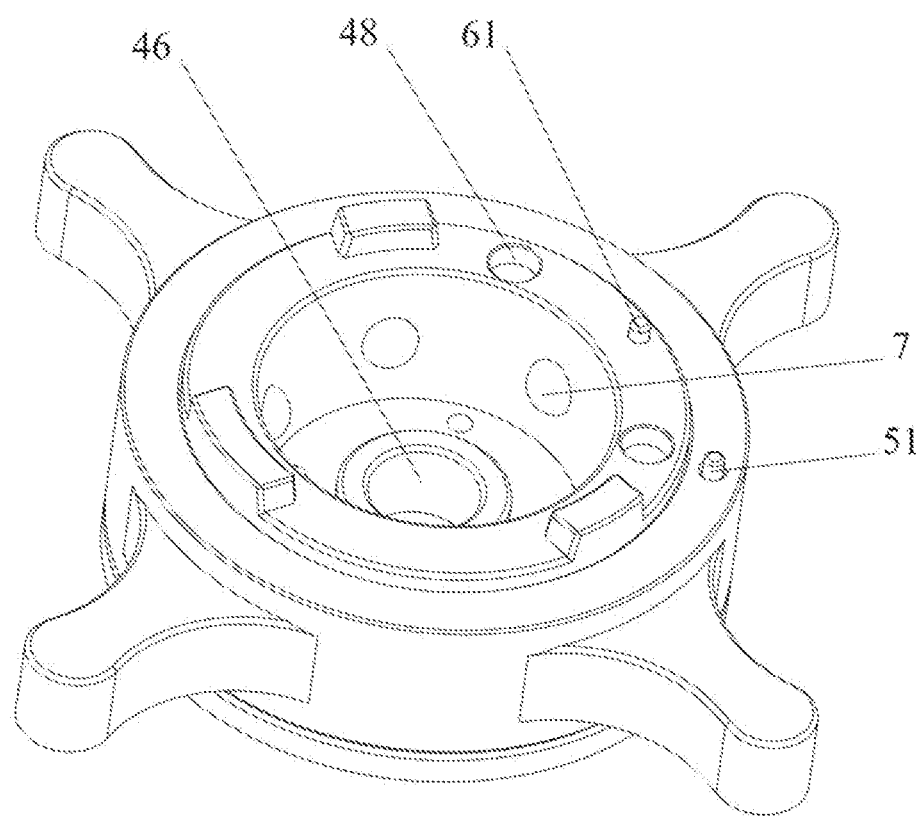
FIG. 4 is a schematic view of a locking means of the detachable quick connection apparatus shown in FIG. 2.

Referring to FIGS. 2 to 4, a detachable quick connection apparatus 100 of an embodiment according to the present disclosure includes a connection assembly 1 and a locking means 30. The connection assembly 1 is detachably connected to and fixed in the locking means 30. The connection assembly 1 includes a connection plate 12 and a connection seat 11 mounted thereon. The connection plate 12 includes two axial ends opposite to each other, wherein the upper end is configured to install a camera or a platform, and the lower end is configured to be connected with the connection seat 11. The connection seat 11 is substantially in a cylinder shape, of which a periphery is provided with an engagement slot 111. In this embodiment, the connection plate 12 substantially has a disc shape. It can be appreciated that the connection plate 12 can also be designed as other available configurations. In this embodiment, the engagement slot 111 is an annular slot. Preferably, the engagement slot 111 is recessed along the peripheral sidewall of the connection seat 11. In this embodiment, the upper end of the connection plate 12 is provided with a plurality of screws for connection with a camera. Preferably, the connection plate 11 is connected onto the connection plate 12 by a plurality of screws. It is also preferred that the connection seat 11 can be also connected onto the connection plate 12 in other known manners.

Figure 5:
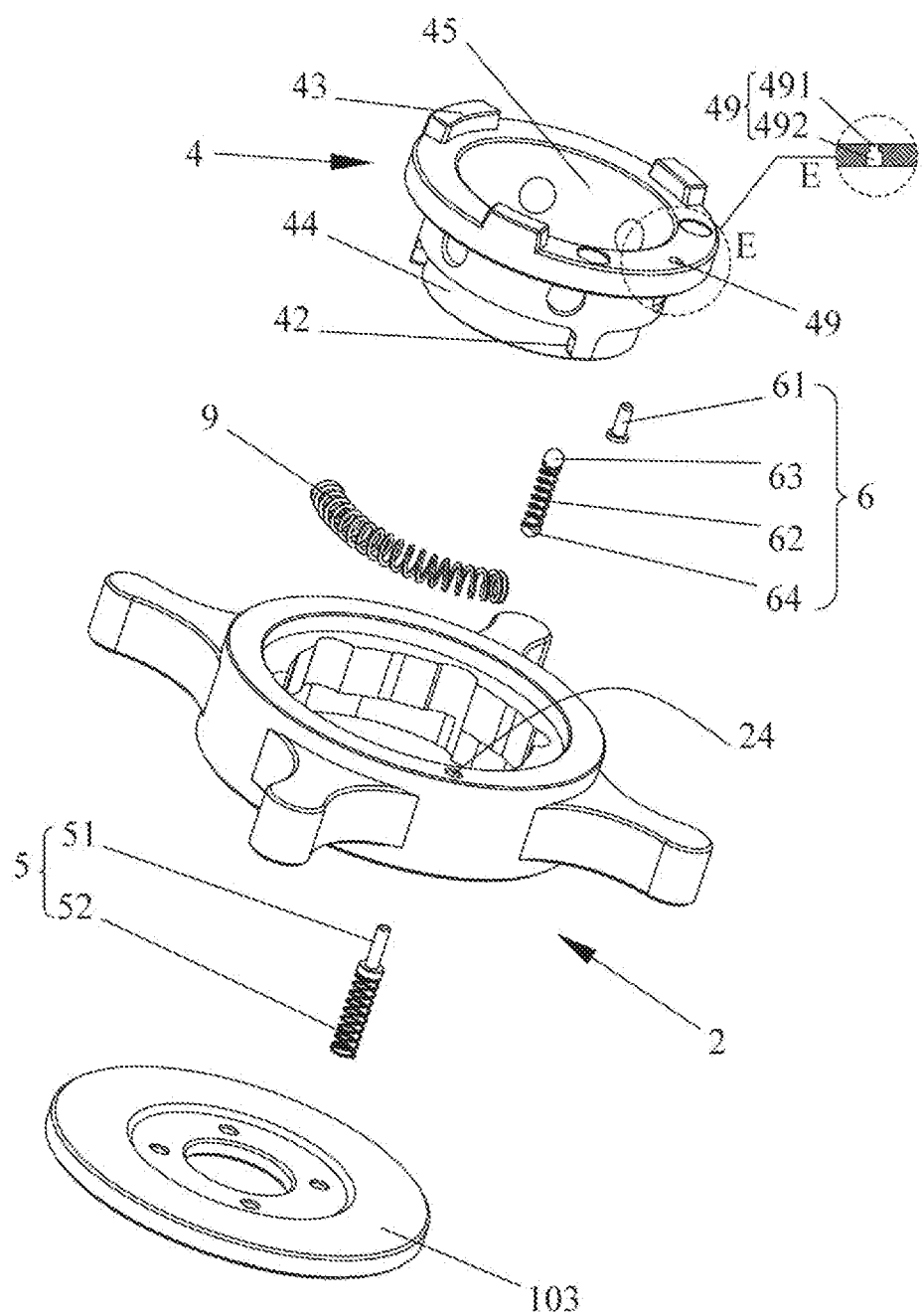
FIG. 5 is an exploded view of the locking means shown in FIG. 4.

Referring to FIGS. 3 to 5, the locking means 30 includes a base 103, a fixed seat 4 mounted on the base 103 and a driving means 2. The driving means 2 is mounted around the fixed seat 4 and is arranged between an upper end of the fixed seat 4 and the base 103. A latching member 7 is provided between the driving means 2 and the fixed seat 4. In this embodiment, the base 103 is connected to the bottom of the fixed seat 4 by a first fastening member 101. The fixed seat 4 is substantially cylindrical and hollow, having a receiving space 45 in which the connection assembly 1 is locked. A flange 47 extends radially outward from an end of the fixed seat 4 adjacent to the connection assembly 1. At least one protrusion 43 is perpendicularly provided on the flange 47. A lower surface of the connection assembly 1 is provided with at least one locating slot 13 matching with the protrusion 43. When the connection assembly 1 is connected onto the locking means 30, the protrusion 43 is engaged into the locating slot 13 to prevent a rotation of the connection assembly 1 relative to the fixed seat 4. The protrusion 43 is preferably configured to have a wider upper portion and a narrower lower portion, and in this embodiment, the protrusion 43 is in an isosceles trapezoid shape with above configuration. Accordingly, the configuration of the locating slot 13 is matched with the protrusion 43 so that the protrusion 43 can be fittingly engaged with the locating slot 13 without gaps. Preferably, the height of the protrusion 43 is greater than the depth of the locating slot 13 so that a fittingly engagement is still ensured by the effect of a slope of the protrusion even though the locating slot 13 becomes larger because of wear after the apparatus having been used for a long time. At least one through hole 41 is defined in a sidewall of the fixed seat 4. In this embodiment, a plurality of radial through holes 41 are provided, with each through hole 41 is provided with a latching member 7 which is movably arranged thereat. The latching member 7 can move inwards along a radial direction of the fixed seat 4 under an action of a radially inward force to at least partially pass through the through hole 41 to be engaged into the engagement slot 111, and can move outwards along the radial direction of the fixed seat 4 under an action of a radially outward force to be disengaged from the engagement slot 111. In this embodiment, the latching member 7 is a ball. The diameter of the latching member 7 is larger than the diameter of the through hole 41, thereby ensuring that the latching member 7 only partially exposes from the through hole 41 to engage into the engagement slot 111 of the connection seat 11 of the connection assembly 1, preventing from being separated from the through hole 41 and dropping into the engagement slot 111. It can be appreciated that the latching member 7 can also be designed as other configurations which can be engaged into the engagement slot 111. Moreover, the protrusion 43 can be omitted when the engagement slot 111 is configured as a plurality of recessed grooves provided at intervals.

Figure 7:
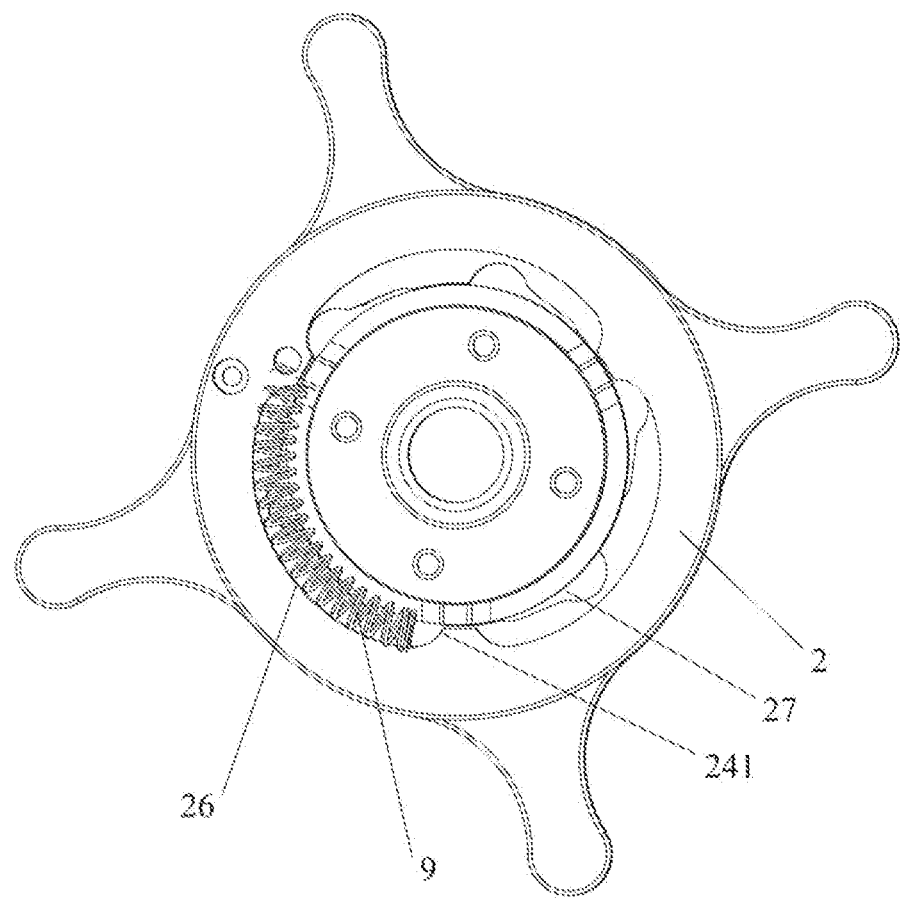
FIG. 7 is a plan view of a driving means shown in FIG. 2 assembling with a fixed seat.
Figure 9:
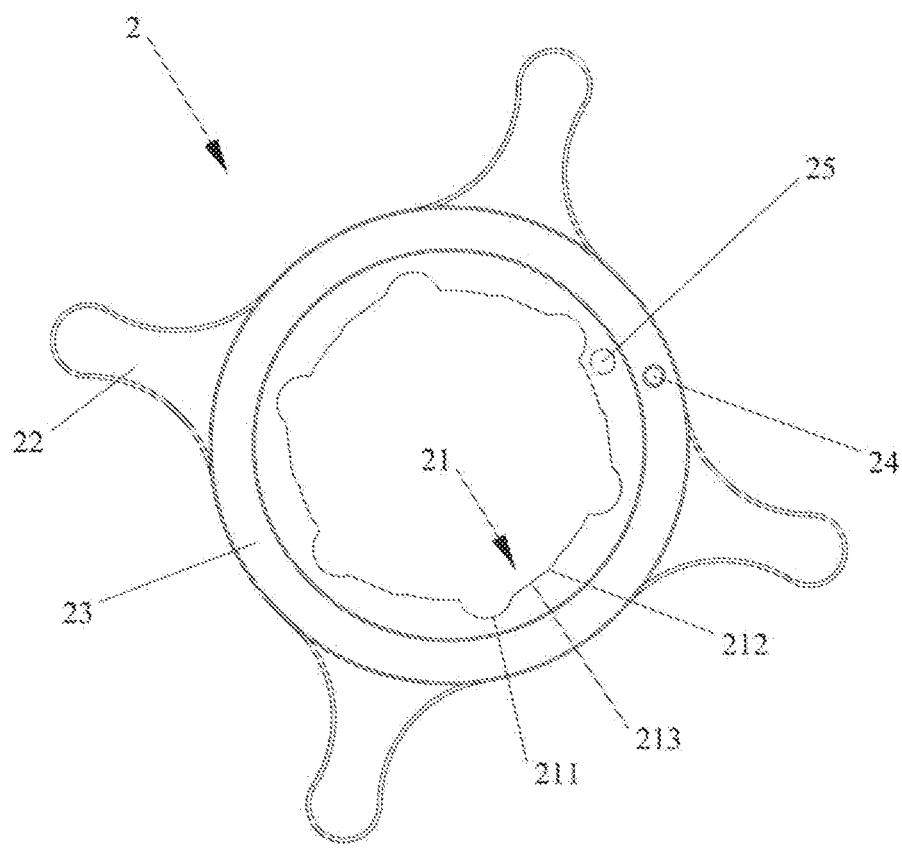
FIG. 9 is a plan view of the driving means shown in FIG. 8.

The driving means 2 includes a driving body 23 and at least one handle 22 extending radially outwardly from the driving body 23. The driving means 2 is mounted around the fixed seat 4 and can rotate relative there to. Referring to FIGS. 5, 7 and 9, an inner surface of the driving body 23 includes an acting portion 21, which is spaced apart from an outer surface of the fixed seat 4 with a gap 27 formed there between, and the gap 27 has a width which is wider in a first circumferential side 211 of the acting portion 21 and narrower in an opposite second circumferential side 212 of the acting portion 21. Each latching member 7 locates in a respective gap 27 and is corresponding to a through hole 41 of the fixed seat 4, as such, when the driving means 2 rotates relative to the fixed seat 4, the acting portion 21 rotates accordingly along the circumferential direction so that to vary the width of the gap 27 at the position between the inner surface of the driving body 23 and the position of the through hole 41 of the fixed seat 4. When the first circumferential side 211 of the acting portion is aligned with the through hole 41, the latching member 7 can be entirely received into the gap 27 without protruding from the through hole 41 into the fixed seat 4. When the second circumferential side 212 of the acting portion 21 is aligned with the through hole 41, the latching member 7 is pressed by the inner surface of the acting portion 21 due to a reduction of width of the gap 27 to pass through the through hole 41 and partially protrude into the fixed seat 4, thereby locking the connection seat 11. Therefore, in this context, a position of the first circumferential side 211 of the acting portion 21 aligned with the through hole 41 is defined as a releasing position, and a position of the second circumferential side 212 of the acting portion 21 aligned with the through hole 41 is defined as a locking position.

Figure 6:
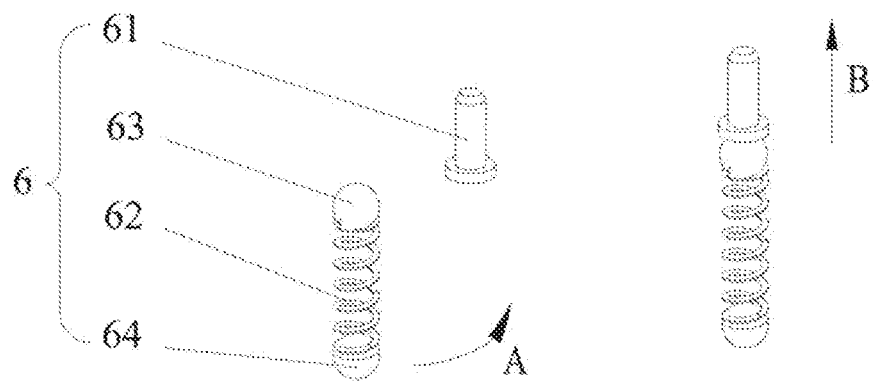
FIG. 6 is an illustration a locking member of the locking means shown in FIG. 4 in operation.

The locking means 30 includes a locking member 6. The locking member 6 includes a pushing member 61, a locating member 63 and a first elastic member 62. The locating member 63 and the first elastic member 62 are mounted in the driving means 2. The locating member 63 abuts against a top end of the first elastic member 62. In this embodiment, the locking member 6 further includes an auxiliary member 64 abutting against a lower end of the first elastic member 62. Preferably, the auxiliary member 64 is ball shaped in order to smoothly rotate and avoiding damaging the base 103. A stepped hole 49 is provided in the flange 47 of the fixed seat 4. The pushing member 61 of the locking member 6 is movably arranged in the stepped hole 49. As shown in cross-section E of FIG. 5, the stepped hole 49 includes a first receiving hole 491 and a second receiving hole 492 arranged axially. The pushing member 61 is movably arranged in the first receiving hole 491 and a bottom end of the pushing member 61 is stopped at a bottom end of the first receiving hole 491. The locating member 63 is dimensioned to be able to partially protrude into the second receiving hole 492 of the stepped hole 49 of the fixed seat 4. In this embodiment, the locating member 63 is ball shaped. Referring to FIGS. 5 and 6, when the driving means 2 is at the locking position, the locating member 63 and the first elastic member 62 of the locking member 6 are offset from the stepped hole 49 and thus offset from the pushing member 61 of the stepped hold 49, and the first elastic member 62 is in a compressed condition. In the meanwhile, the pushing member 61 is located in the stepped hole 49 of the fixed seat 4. When the driving means 2 is rotated from the locking position to the releasing position, the locating member 63 and the first elastic member 62 of the locking member 6 rotate in a direction A with the driving means 2 until the locating member 63 moves to the position of the second receiving hole 492 of the stepped hole 49 of the fixed seat 4, the locating member 63 partially moves into the second receiving hole 492 of the stepped hole 49 under an action of the first elastic member 62 and meanwhile jack up the pushing member 61 in a movement direction B. Since the locating member 63 which is circumferentially stationary with respect to the driving means 2 is snapped into the second receiving hole 492 of the stepped hole 49 of the fixed seat 4, the driving means 2 retains at the releasing position under an action of the locating member 63 and the first elastic member 62. In this embodiment, the first elastic member 62 is a longitudinally disposed spring.

Moreover, as shown in FIG. 5, an end of the fixed seat 4 away from the flange 47 is provided with a groove 44, an end of the groove 44 is provided with a first stopping portion 42. Referring to FIGS. 5 to 8, the driving means 2 is provided with a limiting notch 26 at a position corresponding to the groove 44 of the fixed seat 4. An end of the limiting notch 26 away from the first stopping portion 42 of the groove 44 is provided with a second stopping portion 241. The groove 44 and the limiting notch 26 form a receiving space to receive a locking spring 9 arranged circumferentially. Two ends of the locking spring 9 are respectively abutting against the first stopping portion 42 and the second stopping portion 241. When the driving means 2 is at the releasing position, the locking spring 9 is in a compressed condition.

Figure 8:
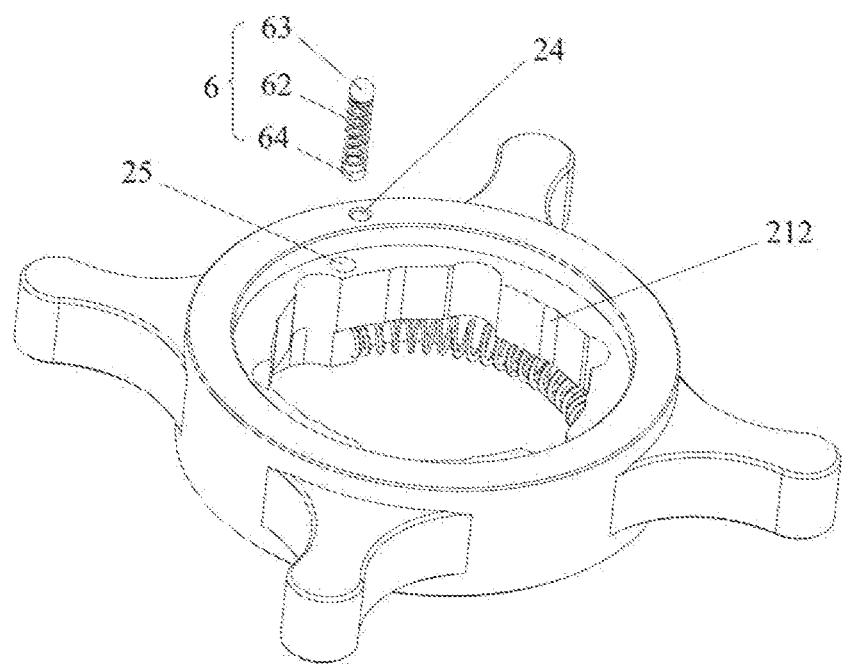
FIG. 8 is a schematic view of a driving means of the detachable quick connection apparatus shown in FIG. 2.

Referring to FIGS. 7 to 9, the acting portion 21 of the driving means 2 forms the first circumferential side 211 and the second circumferential side 212 of the acting portion 21 by protruding radially inwardly with different dimensions. The distance between a surface of the acting portion 21 and the periphery of the driving body 23 varies, a distance corresponding to the first circumferential side 211 at the releasing position is greater than a distance corresponding to the second circumferential side 212 at the locking position. In this embodiment, a couple pair of first circumferential side 211 and second circumferential side 212 adjacent to each other are provided in the circumferential direction of the acting portion 21. In this embodiment, the first circumferential side 211 is designed as a hole recessed radially outwardly, which is preferably semicircular. Preferably, the second circumferential side 212 is a curved surface. For a better operation of the driving means 2, a transitional surface 213 is further provided between the first circumferential side 211 and the second circumferential side 212. A distance of the transitional surface 213 spaced apart from the periphery of the driving body 23 is between the distance of the first circumferential side 211 away from the periphery of the driving body 23 and the distance of the second circumferential side 212 spaced away from the periphery of the driving body 23. Preferably, the transitional surface 213 is provided as an inclined surface. In order to make the latching member 7 of the detachable quick connection apparatus 100 smoothly move on the acting portion 21, each surfaces of the acting portion 21 has a rounded transition. Based on this, the gap 27 is defined among the first circumferential side 211, the second circumferential side 212 and the transitional surface 213 of the acting portion 21 and the outer surface of the fixed seat 4. Different positions of the acting portion 21 can face the latching member 7 with the rotation of the driving means 2 relative to the fixed seat 4 and thus change the size of the gap 27 so that the latching member 7 moves in the gap 27 to realize a movement of the latching gap 27 between the releasing position and the locking position. A first locating hole 25 is defined on the acting portion 21, for receiving the locating member 63, the first elastic member 62 and the auxiliary member 64 of the locking member 6. The locating member 63 can be engaged between the stepped hole 49 and the first locating hole 25 of the driving means 2, that is, a part of the locating member 63 is engaged in the second receiving hole 492 of the stepped hole 63, and the other part of the locating member 63 is engaged in the first locating hole 25, so that the driving means 2 is held at the releasing position under an action of the locating member 63 and the first elastic member 62. In this embodiment, a length of the locating member 63 in an axial direction of the stepped hole is larger than a length of the second receiving hole 492 in the axial direction.

Referring to FIGS. 3, 5 and 9, the driving body 23 of the driving means 2 defines a second locating hole 24. The second locating hole 24 is provided with a driving member 5. The driving member 5 includes a driving block 51 and a second elastic member 52, and the driving block 51 abuts against an upper end of the second elastic member 52. Preferably, the second elastic member 52 is a longitudinally disposed spring. An upper end of the driving block 51 protrudes from the second locating hole 24. In this embodiment, the second locating hole 24 is arranged adjacent to the first locating hole 25.

Figure 10:
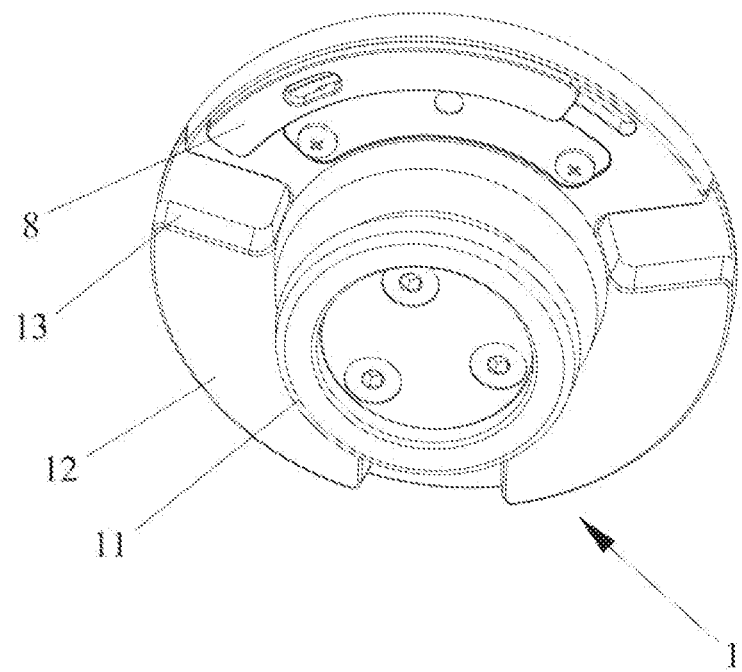
FIG. 10 is a schematic view of a connection assembly of the detachable quick connection apparatus shown in FIG. 2 equipping with a releasing means.
Figure 11:
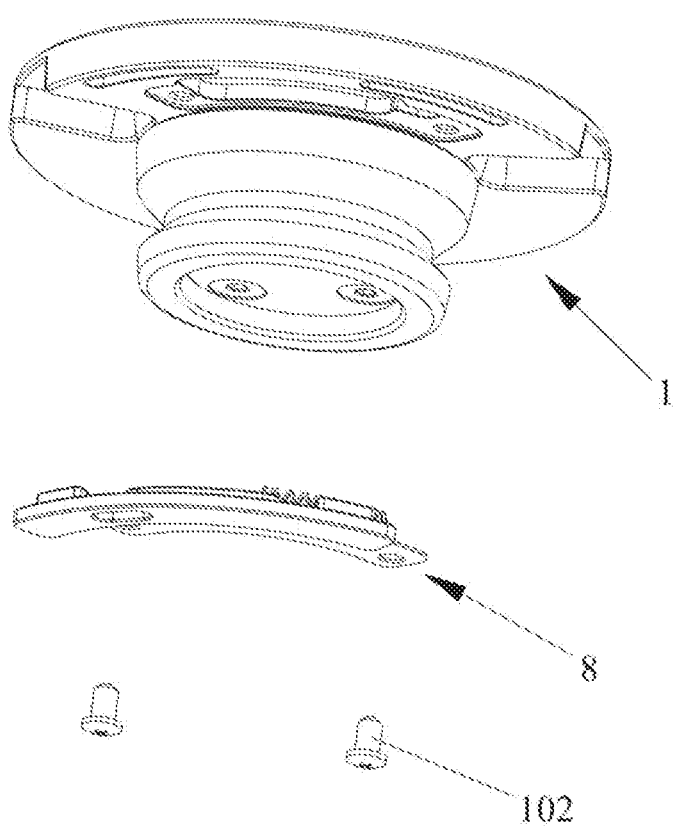
FIG. 11 is an exploded view of the connection assembly equipping with the releasing means shown in FIG. 10.
Figure 12:
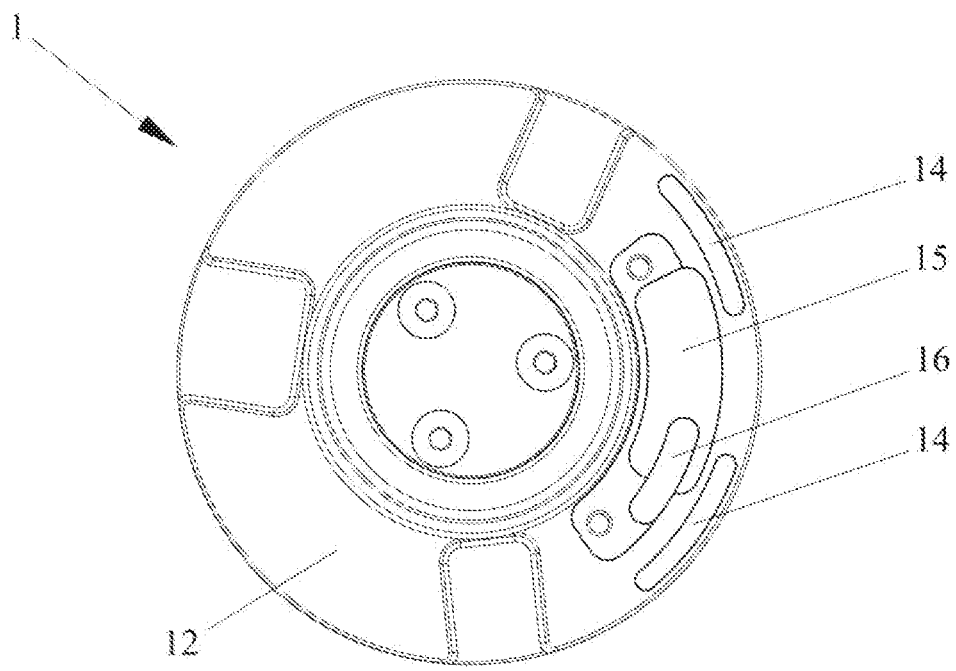
FIG. 12 is a plan view of the connection assembly of the detachable quick connection apparatus shown in FIG. 2.

As shown in FIGS. 10 and 11, the lower surface of the connection plate 12 of the connection assembly 1 of the detachable quick connection apparatus 100 is provided with a releasing means 8. The releasing means 8 is arranged corresponding to positions of the first locating hole 24 and the second locating hole 25. As shown in FIG. 12, the lower surface of the connection plate 12 is provided with at least one first limiting slot 14, a second limiting slot 15 and a recess 16 at a position for mounting the releasing means 8. In this embodiment, the connection assembly 1 is provided with two limiting slots 14. The limiting slots 14 are arranged adjacent to an edge of the lower surface of the connection plate 12. The second limiting slot 15 is arranged adjacent to an inner side of the first limiting slot 14. The recess 16 is arranged at an end of the second limiting slot 15.

Figure 13:
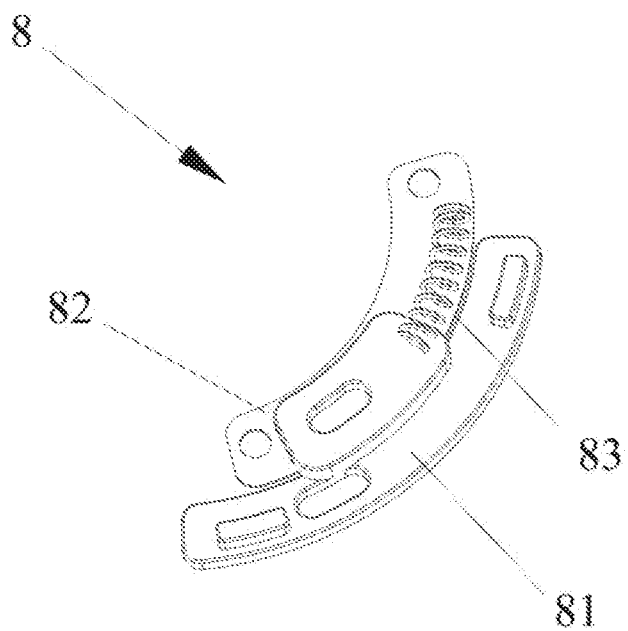
FIG. 13 is a schematic view of a releasing means of the detachable quick connection apparatus shown in FIG. 2.
Figure 14:
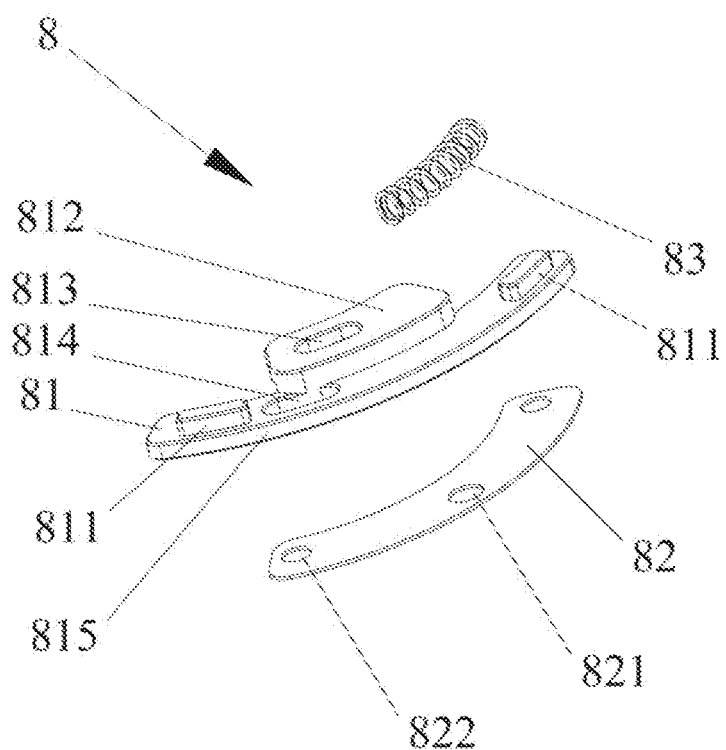
FIG. 14 is an exploded view of a releasing means of the detachable quick connection apparatus shown in FIG. 2.

As shown in FIGS. 13 and 14, the releasing means 8 includes a fixing member 82, a releasing member 81 and a restoring spring 83. The fixing member 82 is fixed on the connection assembly 1, the releasing member 81 is clamped between the fixing member 82 and the connection assembly 1. In this embodiment, each of two ends of the fixing member 82 is provided with a fixing hole 822, by means of which a second fastening member 102 connects the fixing member 82 to the connection assembly 1 so that the fixing member 82 can clamp the releasing member 81 between the fixing member 82 and the connection assembly 1. Preferably, the fixing member 82 has an annular sector profile. Referring to FIGS. 11, 12 and 14, the releasing member 81 includes a releasing body 815. A radial side of the releasing body 815 is provided with a clamping portion 812 which is clamped between the fixing member 82 and the connection assembly 1 and can move relative to the fixing member 82 and the connection assembly 1. The clamping portion 812 can be a radially extending portion. In this embodiment, the clamping portion 812 is a projection and is arranged beyond the releasing body 815. A surface of the clamping portion 812 away from the connection assembly 1 overlaps the fixing member 82, the releasing body 815 is located outside of the fixing member 82. The clamping portion 812 is movably arranged in a second limiting slot 15 of the connection assembly 1. Preferably, an end of the releasing body 815 is provided with a limiting portion 811 facing the connection assembly 1, the limiting portion 811 is movably arranged in one of the first limiting slots 14 of the connection assembly 1. The restoring spring 83 is connected between the connection assembly 1 and the releasing member 81.

The releasing member 81 can move around a center of the connection assembly 1 relative to the fixing member 82. The clamping portion 812 of the releasing member 81 is provided with a first releasing hole 813. The fixing member 82 is provided with a second releasing hole 821. In this embodiment, the second releasing hole 821 is arranged in a circumferential central portion of the fixing member 82. The releasing body 815 defines a driving hole 814. When the driving means 2 is located at the locking position, the second releasing hole 821 of the fixing member 82 is offset from the first releasing hole 813 of the releasing member 81. When the driving means 2 is located at the releasing position, the second releasing hole 821 is aligned with the first releasing hole 813. Referring to FIGS. 3, 12 and 14, when the driving means 2 is located at the locking position, the driving block 51 of the driving member 5 located in the second locating hole 24 of the driving means 2 is partially inserted into the driving hole 814. Referring to FIGS. 5, 6 and 14, when the driving means 2 is rotated, the driving block 51 drives the releasing member 81 to rotate. When the driving means 2 is rotated to the releasing position, the first releasing hole 813 of the clamping portion 812 and the second releasing hole 821 of the fixing member 82 are aligned so that the pushing member 61 of the locking member 6 passes through the second releasing hole 821 under an action of the locating member 63 and the first elastic member 62 to partially enter into the first releasing hole 813. In such a way, the driving means 2 is retained at the releasing position and thus kept at a releasing state.

Figure 15:
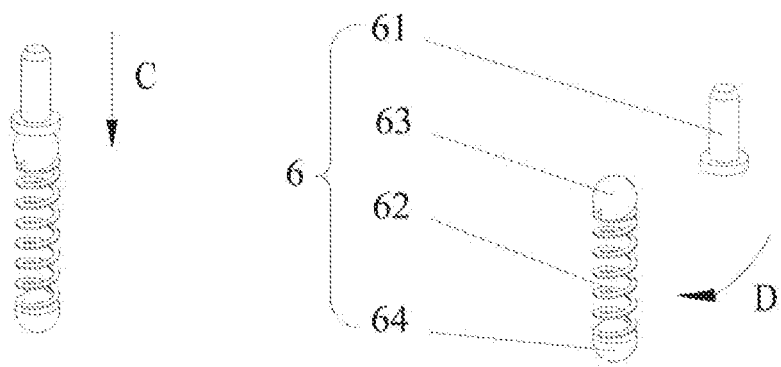
FIG. 15 is another schematic view of a locking member of the locking means shown in FIG. 4.

Referring to FIGS. 3, 14 and 15, when the connection assembly 1 is needed to be locked in the fixed seat 4, it only requires to press the connection assembly 1 into the fixed seat 4. During the pressing, an end of the connection assembly 1 or the releasing member 81 presses downwards the locking member 6, the pushing member 61 of the locking member 6 moves downwardly in a movement direction C so that the locating member 63 and an upper end of the first elastic member 62 move downwardly, and the locating member 63 separates from the stepped hole 49 of the fixed seat 4 so that the engagement of the driving means 2 and the fixed seat 4 is released. As a result, the compressed locking spring 9 is restored and extended and push the driving means 2 which is retained at the releasing position to rotate to the locking position, and then the latching member 7 engages into the engagement slot 111 of the connection assembly 1 under an action of the acting portion 21 of the driving means 2. Meanwhile, the rotation of the driving means 2 drives the locking member 6 in a rotation direction D and drives the driving block 51 to rotate to the driving hole 814 of the releasing member 81 of the releasing means 8, and therefore the driving block 51 partially enters into the driving hole 814 under an action of the second elastic member 52. When the driving means 2 is rotated from the locking position to the releasing position, the driving block 51 is rotated with the driving means 2 to drive the releasing member 81 to move with respect to the fixing member 82 so that the first releasing hole 813 of the releasing member 81 is aligned with the second releasing hole 821 of the fixing member 82 to provide a movement space for the pushing member 61 of the locking member 6, and the locating member 63 of the locking member 6 is located in the stepped hole 49 and the first locating hole 25 so that the driving means 2 is kept at the releasing state without any external force, which makes the connection assembly 1 be separated easier. Especially when a camera is mounted on the connection assembly 1, since the weight of the camera is applied on the connection assembly 1, the above configuration makes the releasing of the connection assembly 1 easier.

In order to describe the releasing process of the detachable quick connection apparatus, referring to FIGS. 3, 6 and 14 again, when the driving means 2 rotates from the locking position to the releasing position, the driving means 2 is rotated relative to the fixed seat 4, and the driving block 51 of the driving member 5 moves with the rotation of the driving means 2 and drives the releasing member 81 to move with respect to the fixing member 82 by the driving hole 814 of the releasing member 81 of the releasing means 8, which results in change of position of the acting portion 21 of the driving means 2 correspond to the through hole 41 of the fixed seat 4, and the locating member 63 and the first elastic member 62 of the locking member 6 moving in a rotation direction A with the driving means 2. When the driving means 2 is at the releasing position, the first releasing hole 813 of the releasing member 81 is aligned with the second releasing hole 821 of the fixing member 82, and the locating member 63 of the locking member 6 moves to the position of the stepped hole 49 of the fixed seat 4, the locating member 63 partially enters into the stepped hole 49 under an action of the first elastic member 62 to upwardly jack up the pushing member 61 in the movement direction B to make the pushing member 61 enter into the movement space which is formed when the first releasing hole 813 is aligned with the second releasing hole 821, and the locating member 63 is engaged in the stepped hole 49 under an action of the first elastic member 62, so that the driving means 2 is locked at the releasing position. Meanwhile, the first circumferential side 211 of the acting portion 21 is corresponding to the through hole 41 of the fixed seat 4 to provide a releasable gap for the latching member 7 so that the latching member 7 can be removed from the engagement slot 111 of the connection seat 11 of the connection assembly 1, and thus the locking of the connection assembly 1 in its axial direction is removed to release the connection assembly 1 from the locking means 30.

The present disclosure provides the detachable quick connection apparatus 100 which is simple in the structure, compact, easy to carry and convenient to assemble and disassemble. The apparatus can lock automatically, has a reliable locking effect and improves the security of the connection.

In summary, the above descriptions are only illustrative embodiments of the present disclosure, which are not intended to limit the scope of the present disclosure. That is, equivalent changes and modifications made according to the contents of the present disclosure should also be within the scope of the present disclosure.

What is claimed is:

1. A detachable quick connection apparatus for photographic equipment, comprising:
   a locking means comprising a fixed seat of which a sidewall is provided with at least one through hole, and a driving means mounted around the fixed seat and rotatable relative to the fixed seat between a locking position and a releasing position, at least one latching member being provided between the fixed seat and the driving means; and
   a connection assembly detachably mounted in the locking means, of which a periphery is provided with an engagement slot which is engaged by the locking member at the latching position through the through hole;
   wherein the locking means further comprises a locking member provided in the driving means and a locking spring arranged between the fixed seat and the driving means, the locking member comprises a locating member and a first elastic member which abut against each other and are mounted in the driving means, when the driving means is at the releasing position, the locating member is at least partially engaged between the fixed seat and the driving means so that the driving means is stopped at the releasing position.

2. The detachable quick connection apparatus for photographic equipment according to claim 1, wherein the locking member further comprises a pushing member, a stepped hole is defined in the fixed seat, the stepped hole comprises a first receiving hole and a second receiving hole arranged axially, the pushing member is movably arranged in the first receiving hole of the stepped hole, when the driving means is at the releasing position, the locating member is at least partially engaged into the second receiving hole of the stepped hole and abuts against the pushing member, an end of the pushing member protrudes from the stepped hole.

3. The detachable quick connection apparatus for photographic equipment according to claim 2, wherein a length of the locating member of the locking member in an axial direction of the stepped hole is larger than a length of the second receiving hole of the stepped hole in the axial direction.

4. The detachable quick connection apparatus for photographic equipment according to claim 1, wherein an inner surface of the driving means comprises an acting portion which is spaced apart from an outer surface of the fixed seat with a gap formed there between, and the gap has a width which is wider in a first circumferential side of the acting portion and narrower in an opposite second circumferential side of the acting portion, each of the at least one latching member locates in a respective gap, when the driving means rotates relative to the fixed seat, the acting portion rotates along its circumferential direction, the first circumferential side of the acting portion is aligned with the through hole at the releasing position, the second circumferential side of the acting portion is aligned with the through hole at the locking position.

5. The detachable quick connection apparatus for photographic equipment according to claim 4, wherein a first locating hole is defined on the acting portion for receiving the locating member and the first elastic member of the locking member.

6. The detachable quick connection apparatus for photographic equipment according to claim 1, wherein at least one protrusion is provided on a flange of the fixed seat adjacent to the connection assembly, the connection assembly is provided with a locating slot matching with the protrusion.

7. The detachable quick connection apparatus for photographic equipment according to claim 1, wherein the locking means comprises a driving member, the driving means comprises a second locating hole, the driving member is provided in the second locating hole.

8. The detachable quick connection apparatus for photographic equipment according to claim 7, wherein a releasing means facing the fixed seat is mounted in the connection assembly, the releasing means is arranged corresponding to a position of the second locating hole.

9. The detachable quick connection apparatus for photographic equipment according to claim 8, wherein the releasing means comprises a fixing member and a releasing member movable relative to the fixing member, a driving block of the driving member protrudes into the releasing member at the locking member, when the connection assembly is released, the driving means is rotated from the locking position to the releasing position, the driving block drives the releasing member to rotate, the pushing member of the locking member protrudes into the releasing member at the releasing position.

10. A photographic equipment assembly, comprising:
   a camera stand; and
   wherein the photographic equipment assembly further comprises the detachable quick connection apparatus for photographic equipment according to claim 1, the detachable quick connection apparatus is mounted on the camera stand.

* * * * *